Oct. 7, 1930.                    W. STERN                    1,777,939
                        SUMMATION INDICATING INSTRUMENT
                             Filed March 12, 1930
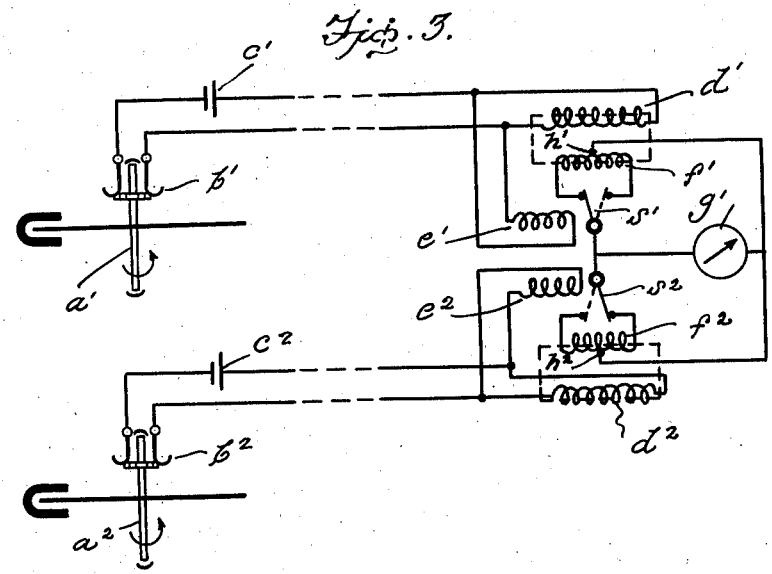
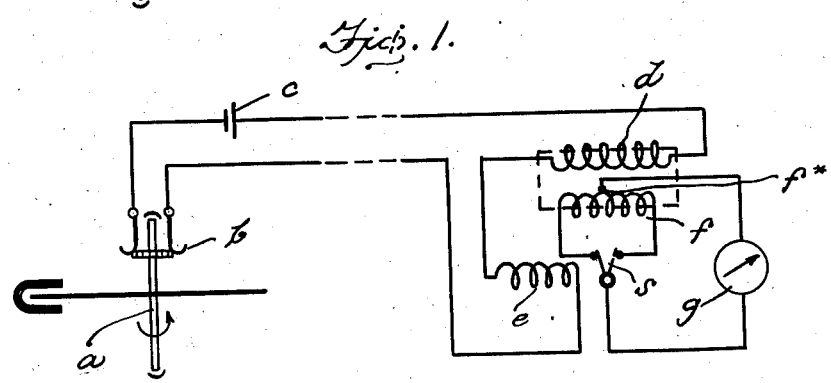
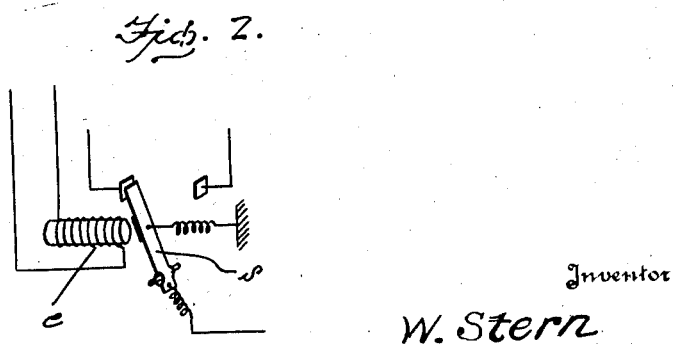
Inventor
W. Stern
By
Attorney Patented Oct. 7, 1930

1,777,939

UNITED STATES PATENT OFFICE

WALTER STERN, OF BERLIN-WILMERSDORF, GERMANY, ASSIGNOR TO FIRM ARON-WERKE ELEKTRIZITATS AKTIENGESELLSCHAFT, OF BERLIN-CHARLOTTENBURG, GERMANY

SUMMATION INDICATING INSTRUMENT

Application filed March 12, 1930, Serial No. 438,620, and in Germany March 11, 1929.

This invention relates to the problem of measuring electrical values at a distance from the point of origin, and more especially to measuring the momentary watt consumption, voltage, frequency per second and like values at an observation station away from a primary measuring instrument, i. e. by which the said values or equivalents thereof are originally measured.

The object of the invention is to provide an improved telelectric measuring method and apparatus which is free from the drawbacks inherent to a kindred method known in this art which will be explained hereinafter.

The nature and scope of the invention are briefly outlined in the appended claims and will be more fully understood by the following specification taken together with the accompanying drawing in which the salient features of a preferred embodiment of the invention are diagrammatically shown.

The improved telelectric measuring method consists in causing electric impulses to be periodically sent out from a source of direct current under the control of the primary measuring instrument, causing said D. C. impulses to produce a magnetic flux in a magnetic circuit at a distant point, causing said magnetic flux to produce by induction electric impulses of opposed direction to each other within a separate electric circuit, causing the said induced impulses to be automatically rectified so as to flow in the same direction, and causing the said rectified electric impulses to react upon a ballistic measuring instrument.

The times of making and breaking the D. C. circuit i. e. the duration of the D. C. impulses, sent out under the control of the primary measuring instrument should be made so long that the produced magnetic circuit will not substantially react upon the transmission of the D. C. impulses and not impair the measuring operations concerned.

Before describing more in detail the salient features of the improved method and in which manner the same is performed in practice it will be appropriate to briefly refer to a kindred telelectric method of measuring rotary speed, the number of revolutions and like values which has been known for a long time since.

The said measuring method consists in periodically making and breaking an electric D. C. circuit in which self induction occurs and causing the electric impulses, passing through said circuit, to directly react upon an electric measuring apparatus of the kind in which the deflection of an indicating member represents the rotary speed, etc., of the rotary element to be tested.

A specific feature of said method consists in the direct current, on being sent through a circuit in which self induction occurs, not gaining at once its full strength, as determined by Ohm's law, but by degrees viz. because of the retarding effect of self induction.

Consequently—if the telelectric D. C. circuit is periodically made and broken in quick succession—the average strength of the direct current will become so much smaller the quicker the interruptions occur. This constitutes a serious drawback of the said method, in which nonrectified electric impulses produced by induction are used—in contradistinction to this invention—inasmuch as the accuracy of the measuring operation is directly dependent on the constancy of the source of direct current used.

Another disadvantage lies in the fact that the deflection of the indicating member of the measuring apparatus will gradually become smaller i. e. in inverse ratio to the increasing number of revolutions, and that special precautionary measures—such as differential windings, etc.—must be used for avoiding this adverse phenomenon.

The invention is illustrated in the accompanying drawing, in which:—

Figure 1 is a diagrammatic view showing the invention as applied to a single electric meter.

Figure 2 is an enlarged diagrammatic view of the controlling switch.

Figure 3 is a similar view showing the invention as applied to a plurality of meters.

Reverting now to Figures 1 and 2 of the accompanying drawing which shows a preferred embodiment of this invention: $a$ is an electric meter diagrammatically shown, on the main spindle of which a rotary interruption disc $b$ is fixed. By the said disk $b$, under the control of the electric meter $a$, impulses are periodically released from a source of direct current e. g. a battery $c$, said impulses being transmitted to the primary winding $d$ of an induction apparatus $d$, $f$ and a relay $e$.

The secondary winding $f$ of said induction apparatus is provided with a tap connection $f^\times$ arranged in the middle between the ends of the wiring and is connected with a ballistic measuring instrument $g$ by a switch $s$ of known design in such manner that both sections of the secondary winding $f$ are capable of being alternately interconnected with the instrument $g$ under the control of the armature of relay $e$ operating the switch $s$.

On being excited relay $e$ will interconnect through switch $s$ the measuring instrument $g$ with one section of the secondary winding $f$ while the other section of the latter is interconnected with the instrument $g$ while the relay $e$ is not excited.

The operation of the telelectric measuring apparatus described above is as follows:

After the telelectric direct current circuit has been made through the interrupter a direct current impulse is released from the battery $c$.

By the arrival and departure of said D. C. impulse a magnetic circuit is produced within the primary winding $d$ of the induction apparatus and in turn electric impulses passing in opposite direction to each other are induced within the secondary winding $f$.

Concurrently by the cooperation of the relay $e$ with switch $s$ the measuring instrument $g$ is in turn connected with one half section of the secondary winding $f$ at the arrival of the D. C. impulse and with the other section at its departure with the result that both induced impulses will pass through the measuring instrument $g$ in the same direction.

Inasmuch as the measuring instrument $g$ because of its ballistic character indicates only the quantity of electricity produced by the change of flow within the winding $f$, the value indicated by the instrument will directly correspond with the frequency of the impulses.

Various changes and modifications may be made in carrying out in practice the above explained measuring method and in the design of telelectric measuring apparatus of the type described and shown by way of an example, without substantially departing from the spirit and the salient ideas of this invention or sacrificing any advantages obtained thereby:

Convenient means known to those skilled in this art may be provided for so highly intensifying and saturating the magnetic flux issuing from the primary winding $d$ of the induction apparatus that the density of the magnetic flow will be independent, within certain limits, of the strength of the D. C. impulses sent out by the interrupter $b$.

Instead of placing the relay $e$ in series with the primary winding $d$ of the induction apparatus—as shown—it may be preferable to connect the relay in parallel—so as to reduce the self induction, should the latter substantially impair the growth of the electromotoric force within the telelectric D. C. circuit.

Additional intermediary relay or other auxiliary transmission devices may be provided in the telelectric D. C. circuit and a separate battery may be used for exciting the primary winding.

Further experiments have shown that the above explained method may also be used to advantage for measuring jointly a plurality of electrical quantities of the same kind e. g. the momentary watt consumption within several separate circuits of which each has a primary electric meter of its own.

According to Figure 3, it is proposed to employ for this purpose a plurality of interrupters $b'$ and $b^2$ and induction apparatus adapted to receive D. C. impulses, sent out under the control of the respective primary electric measuring instruments; but only one single ballistic measuring instrument is needed.

The impulses are periodically released by such interrupters from independent sources of direct currents as, for example, batteries $c'$ and $c^2$ and transmitted to the primary windings of induction apparatus $d'$ and $d^2$. The secondary windings $f'$ and $f^2$ of the respective induction apparatus are provided with tapping connections $h'$ and $h^2$ arranged in the center between the ends of the wiring, both such tapping connections being connected to a single ballistic measuring instrument, indicated at $g'$. Switches $s'$ and $s^2$ controlled by relays $e'$ and $e^2$ exactly as in the form shown in Figure 1 automatically rectify the induced impulses, as and for the purpose described in connection with the form shown in Figure 1.

The secondary windings of all the induction apparatus concerned should be interconnected in parallel with each other and with the measuring instrument.

Auxiliary switches or other pole changing means may be provided for interconnecting at will the secondary circuits with the ballistic measuring instrument in such manner that the total sum or balance (difference) respectively of the individual telelectrically transmitted quantities is indicated by the latter.

What I claim is:

1. Telelectric measuring apparatus for use with a primary measuring instrument including a source of direct current, an interrupter, adapted to periodically send out under the control of the said primary measuring instrument electric impulses from the source of direct current, an electric induction apparatus having two windings, the primary winding of which is in the circuit through which the said D. C. impulses are sent, an electrically operated ballistic measuring instrument, cooperatively connected with the secondary winding of said electric induction apparatus, and means for rectifying the induced electric impulses so as to pass them in the same direction through the indicating instrument.

2. Telelectric measuring apparatus for use with a primary measuring instrument including a source of D. C., an interrupter adapted to periodically send out under the control of the said primary measuring instrument electric impulses from the source of direct current, an electric induction apparatus having two windings, the primary winding of which is in the circuit through which the said D. C. impulses are sent, an electrically operated ballistic measuring instrument, cooperatively connected with the secondary winding of said electric induction apparatus, and of means for rectifying the induced electric impulses so as to pass them in the same direction through the indicating instrument,—said means comprising a switch connected with the end connections of the said secondary winding and with one terminal of the indicating instrument, a branch conductor connecting the other terminal of the measuring instrument with an intermediate tap of the secondary winding, and a relay, the latter being adapted to operate said switch and being connected in series with the circuit through which the D. C. impulses are sent.

3. Telelectric measuring apparatus for use with a primary measuring instrument including a source of D. C., an interrupter adapted to periodically send out under the control of the said primary measuring instrument electric impulses from the source of direct current, an electric induction apparatus having two windings, the primary winding of which is in the circuit through which the said D. C. impulses are sent, an electrically operated ballistic measuring instrument, cooperatively connected with the secondary winding of said electric induction apparatus, and of means for rectifying the induced electric impulses so as to pass them in the same direction through the said measuring instrument, said means comprising a switch connected with the end connections of the said secondary winding and with one terminal of the indicating instrument, a branch conductor connecting the other terminal of the indicating instrument with an intermediate tap of the secondary winding, and a relay, the latter being adapted to operate said switch and being connected in parallel with the circuit through which the D. C. impulses are sent.

4. Telelectric measuring apparatus for use with a primary measuring instrument comprising a source of D. C., an interrupter adapted to periodically send out under the control of the said primary measuring instrument electric impulses from a source of direct current, an electric induction apparatus having two windings, the primary winding of which is in the circuit through which the said D. C. impulses are sent, an electrically operated ballistic indicating instrument, cooperatively connected with the secondary winding of said electric induction apparatus, means for rectifying the induced electric impulses so as to pass them in the same direction through the measuring instrument,—and means for so highly intensifying and saturating the magnetic flux issuing from the said primary winding that the density of the magnetic flux will be independent, within certain limits, of the strength of the D. C. impulses.

5. Telelectric measuring apparatus for use with a plurality of primary measuring instruments sources of direct current, interrupters adapted to periodically send out under the control of said primary measuring instruments separate electric impulses from the sources of direct current, a corresponding number of electric induction apparatus, each having two windings, the primary winding of which is in the circuit through which the said direct current impulses are sent, one single electrically operated ballistic measuring instrument, cooperatively connected in parallel with the secondary windings of the induction apparatus concerned, means for automatically rectifying the individual induced electric impulses, so as to cause them to flow in the same direction, and pole changing means for interconnecting at will the secondary windings of any of the induction apparatus with the ballistic measuring instrument so as to cause the total sum and difference respectively of the individual telelectrically transmitted electrical quantities to be indicated by the latter.

In testimony whereof I have signed my name to this specification.

WALTER STERN.